Nov. 19, 1929.   A. P. RICARD   1,736,368
FLUSH TANK VALVE
Filed Nov. 21, 1927
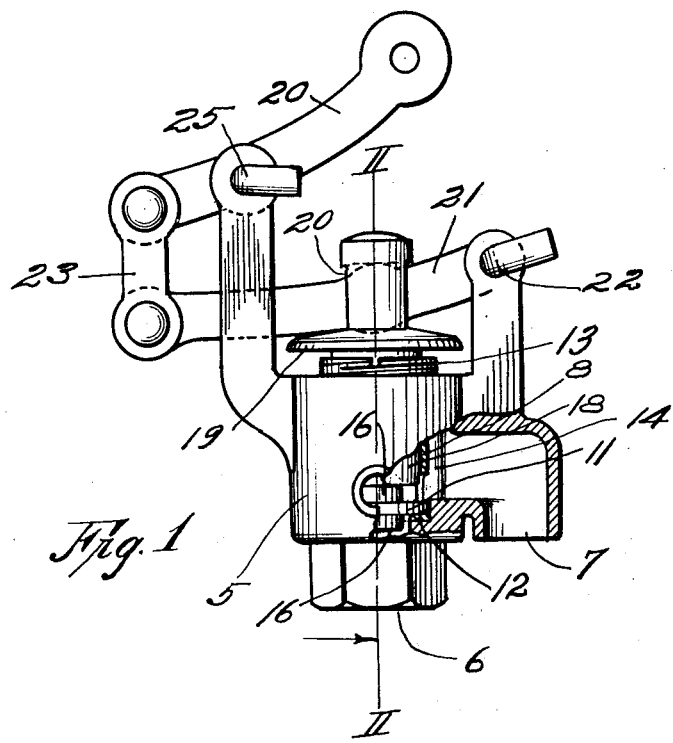
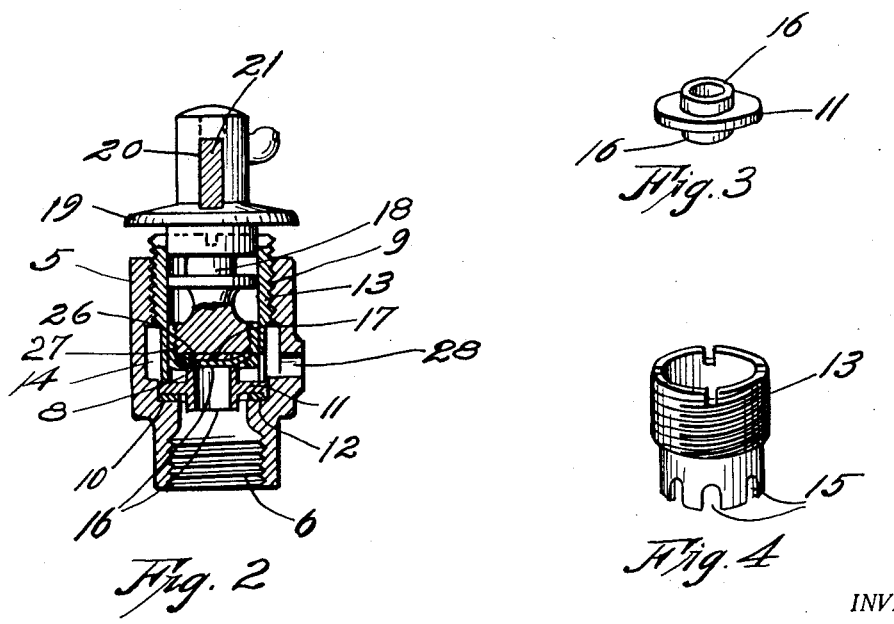
INVENTOR.
Arthur P. Ricard
BY
Roy E. Hamilton
ATTORNEY.

Patented Nov. 19, 1929

1,736,368

UNITED STATES PATENT OFFICE

ARTHUR P. RICARD, OF KANSAS CITY, MISSOURI

FLUSH-TANK VALVE

Application filed November 21, 1927. Serial No. 234,762.

This invention relates to flush valves, and especially to the lever action type which is used in closet tanks for permitting the inflow of water to said tank after the flushing operation, and also to stop the inflow of water when a predetermined water level is reached in the tank.

The main object of this invention is to provide a flush valve having a reversible valve seat member provided with two oppositely disposed valve seats. When one of said seats becomes worn the valve seat member may be reversed so that the opposite seat comes in operative relation with the valve.

A further object is the provision of a reversible valve seat member which is held in operative position by means of an adjustable sleeve in which the valve is reciprocably mounted.

Minor objects will appear during the course of the detailed specification, in which Figure 1, is a side elevation of a flush valve partly broken away, embodying this invention.

Fig. 2, is a central section taken on line II—II of Fig. 1, with the valve stem partly in elevation and partly in section.

Fig. 3, is a perspective view of the reversible valve seat member, and

Fig. 4, is a perspective view of the sleeve detached.

Similar reference characters designate like parts thruout the several views, and the numeral 5 designates a valve body having an inlet 6 and an outlet 7 which communicate with the valve chamber 8. Extending thru the valve body 5 and in axial alignment with the inlet 6 is a passage-way having a threaded portion 9. Within the valve body 5, and intermediate the inlet 6 and the outlet 7 is an off-set annular groove 10 which is adapted to receive the reversible valve seat member 11, provided with a suitable gasket 12, and firmly held in operative position by means of a screw threaded sleeve 13, which engages the threaded portion 9 of the valve body. The valve seat member is of such diameter that it may be removed and inserted thru the passage-way in the valve body. It will be noted that the valve body, just above the valve seat member is under cut and that the outer periphery of the sleeve 13 is reduced at its lower end, thus forming an annular chamber 14, which communicates with the outlet 7. The lower end of the sleeve 13 is provided with openings 15, which communicate with passage 14. The valve seat member 11 is provided with two oppositely disposed valve seats 16, both of which, when in the operative position are in the same predetermined fixed position relative to the valve body, however, the relative position of these valve seats may be changed by changing the distance of the valve seat from the main body of the valve seat member.

Slidably mounted in sleeve 13 and in operative relation with valve seat 16 is a valve 17 having a stem 18, which projects beyond the valve body and is provided with an annular flange 19, adapted to deflect any water passing thru valve sleeve 13 around valve stem 18. The valve stem 18 is also provided with a slot 20 thru which a cross bar 21 passes, said cross bar being pivoted at 22 and pivotally connected with link 23, which in turn is pivotally connected with the lever arm 24, pivoted at 25, and adapted to securely engage an operating float member, not shown. Many other suitable valve control means may be used to operate this valve.

As clearly shown in Fig. 2, the valve 17 is provided with a removable facing 26, which is held in position by screw cap 27. The valve body has the usual opening 28, which communicates with the chamber 14 and insures the proper seating of the valve. In order to facilitate the positioning of sleeve 13, screw driver slots 29 are formed in the outer end of said sleeve.

When it is desired to reverse the valve seat member the valve is removed then the sleeve unscrewed. The valve seat member can then be turned over or removed thru the opening.

I do not limit this invention to the device shown and described, as many modifications may be made within the scope of the appended claims without departing from the spirit of the invention.

What I claim is:

1. In a valve of the character described, a valve body having an inlet and an outlet, a reversible valve seat member, having two oppositely disposed valve seats, positioned in said valve body intermediate said inlet and outlet, a sleeve adjustably mounted in and extending beyond said valve body to engage and secure said valve seat member in operative position, and a valve slidably mounted in said sleeve to cooperate with one of said valve seats.

2. In a valve of the character described, a valve body having an inlet and an outlet, a reversible valve seat member, having two oppositely disposed valve seats, positioned in said valve body intermediate said inlet and outlet, a sleeve adjustably mounted in said valve body to engage and secure said valve seat member in operative position and having the outer portion thereof extending beyond said valve body, slots in the outer edge of said sleeve, openings in said sleeve adjacent said valve seat, a valve slidably mounted in said sleeve to cooperate with one of said valve seats, and means for moving said valve to and from the closed position.

3. In a valve of the character described, a valve body having an inlet and an outlet, a valve seat member removably mounted in said valve body intermediate said inlet and outlet, a sleeve adjustably mounted in said valve body with its inner end engaging said valve seat member and its outer portion extending beyond said valve body, means in the outer portion of said sleeve for adjusting the same, and a valve slidably mounted in said sleeve to cooperate with said valve seat.

4. In a valve of the character described, a valve body having an inlet and an outlet, a reversible valve seat member removably mounted in said valve body intermediate said inlet and said outlet, a sleeve of uniform bore thruout adjustably mounted in said valve body with its inner end engaging said valve seat member and its outer end open and projecting beyond said valve body, and a valve slidably mounted in said sleeve to cooperate with said valve seat member and being free to be moved to and from said sleeve.

5. In a valve of the character described, a valve body having an inlet and an outlet, a reversible valve seat member removably mounted in said valve body intermediate said inlet and outlet, a sleeve of uniform bore throughout adjustably mounted in said valve body with its inner end engaging said valve seat member and having its outer end open, a valve slidably mounted in said sleeve to cooperate with said valve seat and free to be moved to and from said sleeve.

ARTHUR P. RICARD.